(12) United States Patent
Chiang

(10) Patent No.: US 7,124,660 B2
(45) Date of Patent: Oct. 24, 2006

(54) HEX-AXIS HORIZONTAL MOVEMENT DYNAMIC SIMULATOR

(76) Inventor: Johnson Chiang, 8F N0. 910 Jungieng Rd., Junghe City, Taipei County (TW)

( * ) Notice: Subject to any disclaimer, the term of this patent is extended or adjusted under 35 U.S.C. 154(b) by 521 days.

(21) Appl. No.: 10/622,506

(22) Filed: Jul. 21, 2003

(65) Prior Publication Data

US 2004/0144288 A1    Jul. 29, 2004

(30) Foreign Application Priority Data

Jul. 23, 2002    (TW) ................................ 91116413 A

(51) Int. Cl.
*B25J 17/00*    (2006.01)
(52) U.S. Cl. ...................... 74/490.05; 901/16; 901/28
(58) Field of Classification Search ............. 74/490.01, 74/490.02, 490.03, 490.05; 901/2, 15, 16, 901/23, 25, 28

See application file for complete search history.

(56) References Cited

U.S. PATENT DOCUMENTS

| | | | |
|---|---|---|---|
| 5,575,597 A * | 11/1996 | Bailey et al. ................ 409/201 |
| 5,656,905 A * | 8/1997 | Tsai ........................ 318/568.21 |
| 5,752,834 A | 5/1998 | Ling |
| 5,975,907 A | 11/1999 | Advani |
| 5,987,726 A * | 11/1999 | Akeel ....................... 29/407.08 |
| 6,041,500 A | 3/2000 | Terpstra |
| 6,099,217 A | 8/2000 | Wiegand et al. |
| 6,196,081 B1 | 3/2001 | Yau |
| 6,240,799 B1 | 6/2001 | Yau |
| 6,330,837 B1 | 12/2001 | Charles et al. |
| 6,378,190 B1 * | 4/2002 | Akeel ....................... 29/407.08 |
| 6,516,681 B1 * | 2/2003 | Pierrot et al. ............. 74/490.01 |

\* cited by examiner

*Primary Examiner*—David Fenstermacher

(57) ABSTRACT

A hex-axis horizontal movement dynamic simulator is aimed at Modular Design without hydraulic or pneumatic system but which were conventionally used in the so called Stewart Platform; this dynamic simulator comprises three sets of movement control unit with symmetrical structure located at the positions relative to each other forming three sides of an equilateral triangle, and a load-carrying platform which connected to the three movement control by means of three sets of universal-joint yoke mechanism each relative position located on the load-carrying platform are each other arranged to form as three sides of an equilateral triangle too; with this type of arrangement, this dynamic simulator have a 6-degree of freedom motion when a sets of movement control unit makes different rectilinear motion, the load-carrying platform will generate a combination of spatial translation motion and angular motion.

7 Claims, 8 Drawing Sheets

HEX-AXIS HORIZONTAL MOVEMENT DYNAMIC SIMULATOR

FIELD OF THE INVENTION

The invention relates to a hex-axis horizontal movement dynamic simulator and more particularly to 6-degrees-of-freedom motion simulating equipment used in modular design.

BACKGROUND OF THE RELATED ART

An early structure of a 6-degrees-of-freedom motion simulating platform was proposed by the Englishman Steward and is customarily called the Stewart Platform. For a long time, there was no significant improvement in the design of the Stewart Platform, which employed a hydraulic or pneumatic system to achieve the effect of changing the length of an actuating rod by varying the stroke of a cylinder rod to enable 6-degrees-of-freedom spatial motion. Moreover, since the parts and components comprising the conventional Stewart Platform were not modular in design and oil and air leakage problems occasionally occurred with the hydraulic and pneumatic systems, the Stewart Platform was inconvenient and required substantial maintenance.

SUMMARY OF THE INVENTION

A goal of the present invention is to provide a solution to the above-described problems of the conventional Stewart Platform by employing a modular design instead of the hydraulic or pneumatic system used by the conventional Stewart Platform.

Another goal of the present invention is to provide a hex-axis horizontal movement dynamic simulator that can simulate the motion of 6 degrees of freedom without employing a hydraulic or pneumatic system.

A further goal of the invention is to provide a hex-axis horizontal movement dynamic simulator having a modular structure that comprises three modular movement control units of the same structure. The modular movement control units are located at positions relative to each other forming three sides of an equilateral triangle and are pivoted to a load-carrying platform by a universal-joint yoke mechanism corresponding to each of the three movement control units.

A further goal of the invention is to provide a specific structure of a modular movement control unit that can precisely control the movement of the load-carrying platform and provide a motion simulation platform having 6 degrees of freedom.

DETAILED DESCRIPTION OF THE INVENTION

Figure 1:
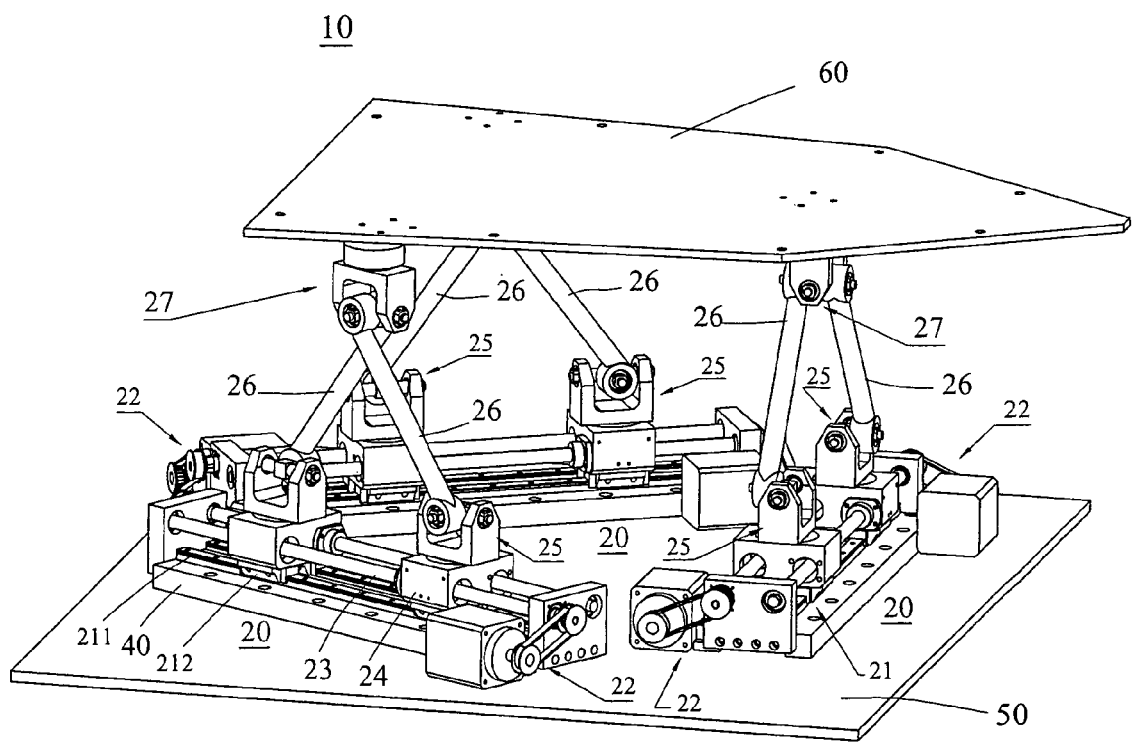
FIG. 1 illustrates a first embodiment of the hex-axis horizontal movement dynamic simulator of the invention that has three sets of movement control units of the same structure located separately at the positions forming three sides of an equilateral triangle.
Figure 2:
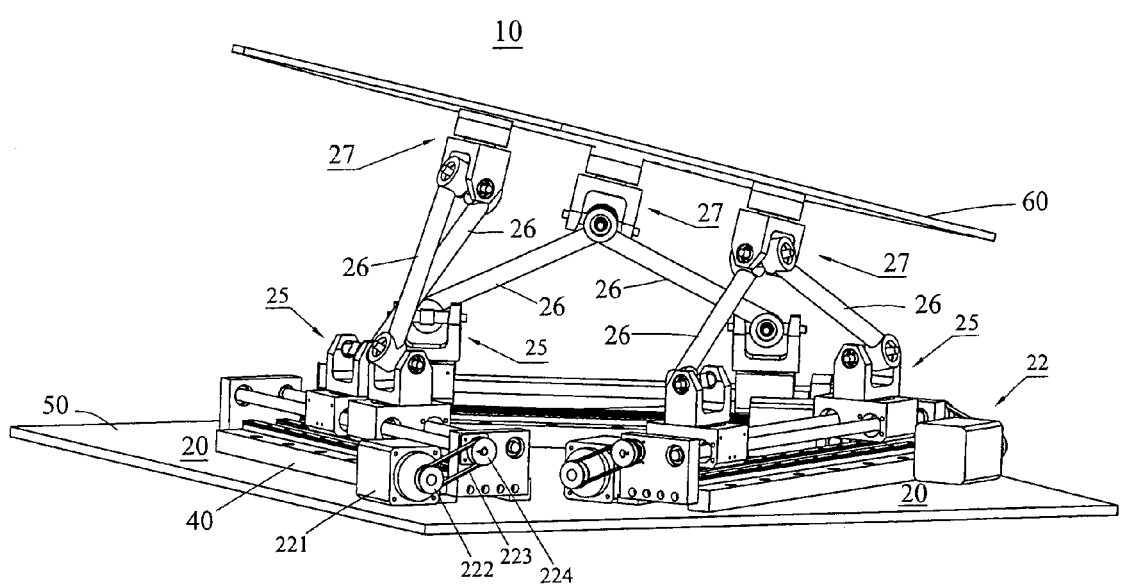
FIG. 2 illustrates the hex-axis horizontal movement dynamic simulator of FIG. 1 showing the variation of translation and angular motion of the load-carrying platform.

Referring now to FIG. 1 and FIG. 2, a key point of the invention is that no hydraulic or pneumatic system is used in a hex-axis motion simulator 10. For each universal-joint yoke mechanism 27, one end of each of two fixed-length connecting rods 26 are pivoted to the universal-joint yoke mechanism 27 and the other ends of the connecting rods 26 are separately connected to a transmission-joint yoke mechanism 25. Further, each transmission-joint yoke mechanism 25 is pivoted to a sliding seat 24 and the rectilinear translation motion and position of each transmission-joint yoke mechanism 25 is controlled by controlling the rectilinear translation and position of the corresponding sliding seat 24 so as to generate a motion of 6 degrees of freedom that controls the spatial motion and position of the load-carrying platform.

Hex-axis horizontal movement dynamic simulator 10 comprises three movement control units 20, of the same structure, that are fixed on a foundation 50 at the locations relative to each other forming three sides of an equilateral triangle. Each of the three movement control units 20 is pivoted to the load carrying platform 60 by a universal-joint yoke mechanism 27. Thus the locations at which the three universal-joint yoke mechanisms 27 are pivoted to the load-carrying platform 60 form an equilateral triangle.

Each movement control unit 20 is symmetrically structured to comprise a universal-joint yoke mechanism 27, two connecting rods of fixed length 26, two transmission-joint yoke mechanisms 25, two sliding seats 24, two lead screws 23, two servo-driving mechanisms 22, and a rectilinear translation guide 21. Since universal-joint yoke mechanism 27 is pivotally connected to load-carrying platform 60, it can generate a motion of 1 degree of freedom relative to load-carrying platform 60. Since one end of each of the two connecting rods 26 is pivotally connected to the same universal-joint yoke mechanism 27, the connecting rod can generate a motion of 2 degrees of freedom.

Therefore, the end of the connecting rod pivoted to the universal-joint yoke mechanism 27 has 3 degrees of freedom for generating a spatial motion relative to the load-carrying platform. Further, the other ends of the two connecting rods are symmetrically pivoted to separate driving joint yoke mechanisms 25 that can generate a spatial motion of 2 degrees of freedom. Since the transmission-joint yoke mechanism 25 of each connecting rod 26 is pivoted to a sliding seat 24, the transmission-joint yoke mechanism 25 has 1 degree of freedom for generating a spatial motion relative to the sliding seat 24. Therefore, the end of the connecting rod 26 pivoted to the transmission-joint yoke mechanism 25 has 3 degrees of freedom relative to the sliding seat 24 for spatial motion.

Based on the above-mentioned arrangement, both ends of each connecting rod 26 of each movement control unit 20 have 3 degrees of freedom for generating a spatial motion. Since all connecting rods are fixed-length rigid bodies, when the sliding seat 24 is displaced rectilinearly, the transmission-joint yoke mechanism 25 on one end of the connecting rod 26 is restricted to rectilinear translation together with the sliding seat 24, which enables the connecting rod 26 to generate a spatial displacement of 6 degrees of freedom. Through the variation of spatial position of every connecting rod 26, the universal-joint yoke mechanism 27 on the other end of the connecting rod 26 will generate a relative spatial-displacement following the rectilinear displacement of the transmission-joint yoke mechanism 25.

Therefore, when the sliding seat 24 makes a rectilinear translation to another place together with the transmission joint yoke mechanism 25 to which it is pivoted, the spatial position of the connecting rod 26 on the transmission-joint yoke mechanism 25 associated with 6 degrees of freedom will vary. That is, the universal-joint yoke mechanism 27 on one end of each connecting rod 26 will change its spatial position relative to the transmission-joint yoke mechanism 25 and actuate the load-carrying platform 60 to vary its spatial position.

Figure 3:
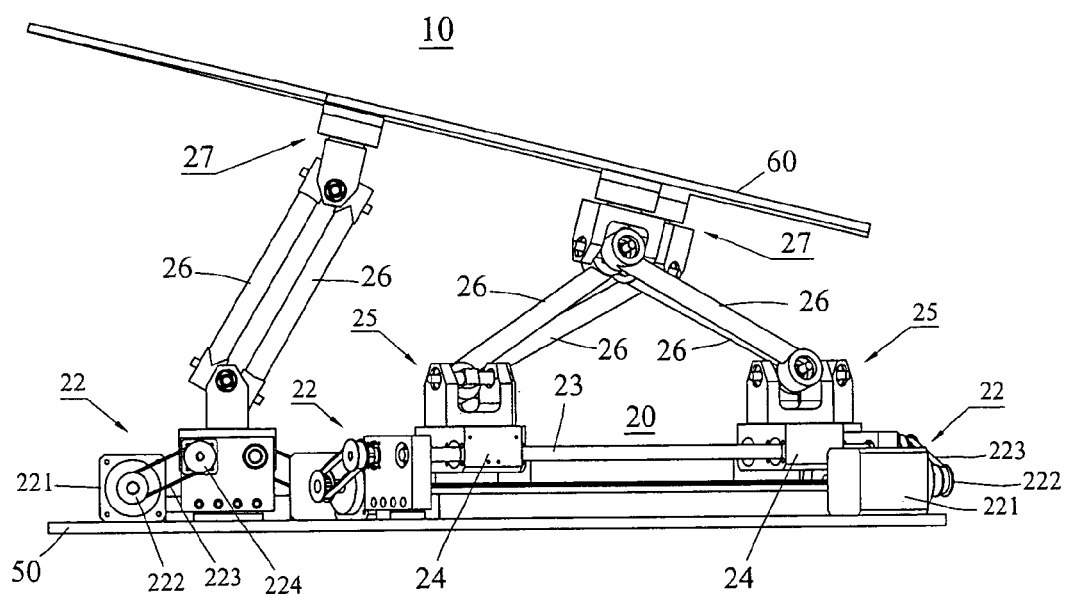
FIG. 3 is a schematic drawing of the invention shown in FIG. 2 as viewed from another direction.
Figure 4:
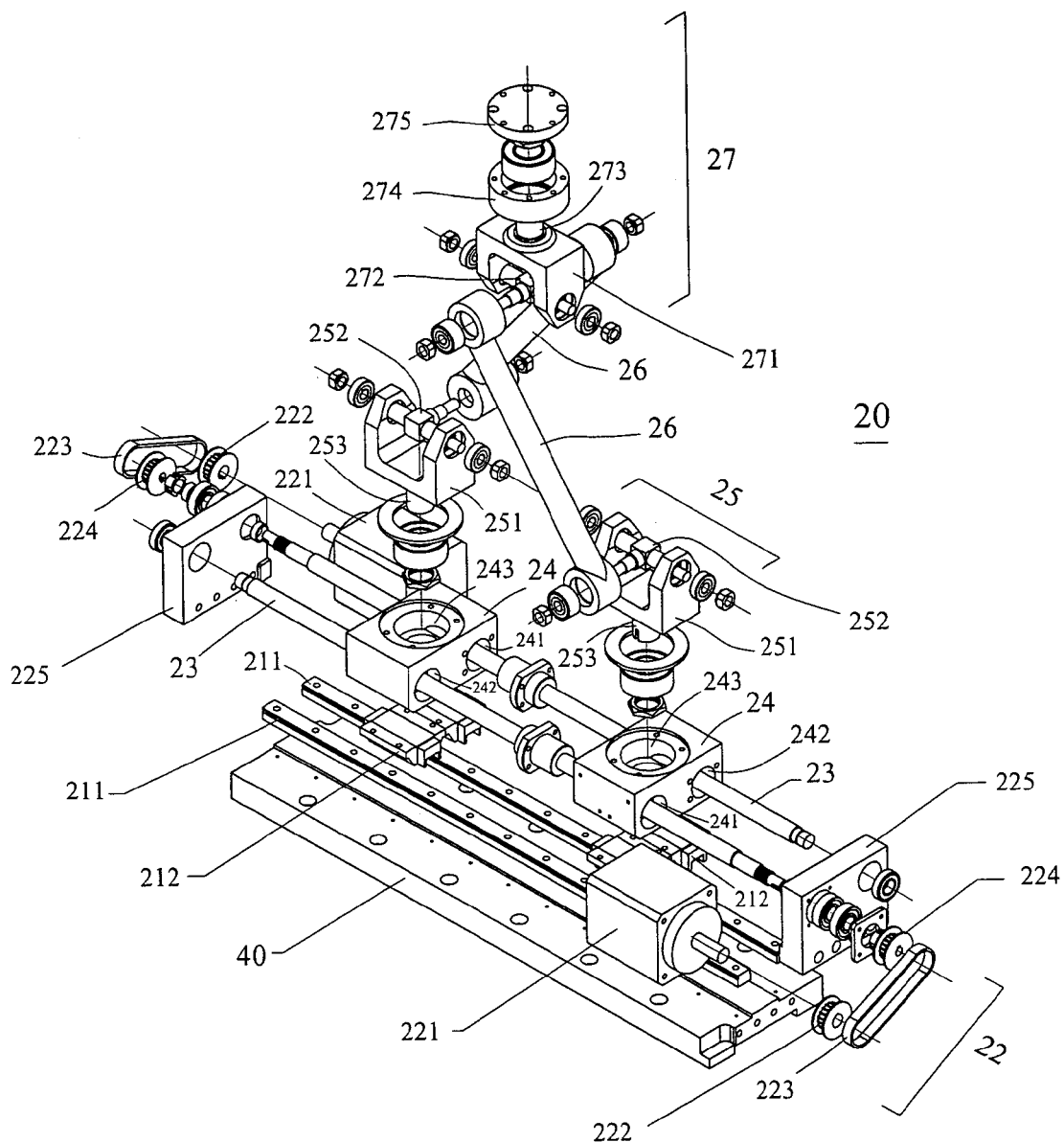
FIG. 4 is a disassembly drawing showing the parts of the movement control unit illustrated in FIG. 1.

Each of FIGS. 1–3 corresponds to the rectilinear displacement of different sliding seats 24, which slide on different movement control units 20 that are respectively located at the positions forming three sides of an equilateral triangle. The sliding seats 24 may have relative displacements for the load-carrying platform 60. Therefore, through the synchronous and precise control of the rectilinear movement of each sliding seat 24 of each movement control unit 20, such as may be provided by a computer system, the spatial movement of each universal-joint yoke mechanism 27 relative to the others can be precisely controlled to achieve a precise control of the motion of load-carrying platform 60 and to generate linear and angular displacement spatially.

The mechanism that enables each sliding seat 24 of each movement control unit 20 to generate a rectilinear motion comprises two lead screws 23, two servo-driving mechanisms 22 having servo-motors 221, a rectilinear translation guide 21 having two guide seats 212 and two straight sliding rails 211. Each sliding seat 24 has a female screw thread that engages with the lead screw 23. The servo-motor 221 of the servo-driving mechanism 22 is employed to drive the lead screw 23 to rotate, which enables the sliding seat 24 on one of the guide seats 212 of the rectilinear translation guide 21 to be guided by the straight sliding rail 211 and to generate rectilinear displacement. Therefore, the rectilinear movement of each sliding seat 24 can be precisely controlled by the precise control of the rotating speed and angular displacement of the servo-motor 221 of each servo-driving mechanism 22, through which a precise control of the variation of linear and angular displacement of the load-carrying platform 60 can be achieved.

The first embodiment of the movement control unit is shown in FIGS. 1–4 and comprises a base seat 40, a universal joint yoke mechanism 27, two connecting rods of fixed length 26, two transmission-joint yoke mechanisms 25, two sliding seats 24, two lead screws 23, two servo-driving mechanisms 22, and a rectilinear translation guide 21. The base seat 40 is a longitudinal plate fastened to the foundation 50 by bolt. The rectilinear translation guide 21 has two linear sliding rails 211 parallel to each other and two identical guide seats 212. The two linear sliding rails 211 are installed on the surface of the base seat 40 along the longitudinal direction of the base seat and parallel to each other, and the bottom side of each guide seat 212 has two parallel guide slots that match the shape and gauge of the two straight sliding rails 211. Thus, each guide seat 212 can be installed on and match the two straight sliding rails 211 and slide on the two straight sliding rails along the guiding direction.

Each servo-driving mechanism 22 comprises a servo-motor 221 assembled with a driving pulley 222, a driving belt 223, a driven pulley 224 and a bearing plate 225 that drives a lead screw 23. The bearing plate 225 of each servo-driving mechanism 22 is installed at a position near a different end of the base seat 40 so as to form a bracket for mounting the two lead screws 23 with bearings and to have the two lead screws 23 parallel to the two straight sliding rails 211. The driving pulley 222 is mounted on the driving shaft of the servo-motor 221, and the driven pulley 224 is mounted on the lead screw 23. The driving pulley 222 and the driven pulley 224 are connected by the driving belt 223.

The sliding seat 24 is rectangular shaped and fastened to the guide seat 212 of the rectilinear translation guide 21. On the sliding seat 24, two penetrating holes 241, 242 are prepared. Hole 241 has a female screw thread and engages with the lead screw 23. The other hole 242 is a passage for another lead screw 23 to pass through. Further, on the top surface of each sliding seat 24, is a mounting recess 243 for pivotally mounting the transmission joint yoke mechanism 25.

The transmission-joint yoke mechanism 25 comprises a U-shaped yoke 251 and a T-shaped pivot axis. The horizontal stub shaft formed on both sides of the T-shaped pivot axis is pivoted to the two vertical portions of the U-shaped yoke 251 by a bearing and nut that enable the perpendicular stub shaft of the T-shaped pivot axis to have 1 degree of freedom of rotational motion relative to the U-shaped yoke 251. On the bottom side of the U-shaped yoke 251, is a mounting shaft 253 that is pivotally mounted to the mounting recess 243 by a bearing and nut that provide the transmission joint yoke mechanism 25 with 1 degree of freedom of rotational motion relative to the sliding seat 24. The perpendicular stub shaft of the T-shaped pivot axis 252 of each transmission-joint yoke mechanism 25 has 2 degrees of freedom of rotational motion relative to the sliding seat 24 to which it is mounted.

The universal-joint yoke mechanism 27 comprises an inverse U-shaped yoke 271, a cardan shaft 272, a neck-ring seat 274, and a cover plate 275. The left and right horizontal stub shafts formed on both sides of the cardan shaft 272 are pivoted to the two vertical portions of the inverse U-shaped yoke 271 by a bearing and nut that enable the perpendicular stub shaft formed on the front and rear side of the cardan shaft (272) to have 1 degree of freedom of rotational motion relative to the inverse U-shaped yoke 271. On the top side of the inverse U-shaped yoke 271, is a mounting shaft 273 that is pivoted to the neck-ring seat 274 by a bearing. A cover plate 275 is mounted on the upper side of the neck-ring seat 274, through which the whole assembly of the universal-joint yoke mechanism 27 is mounted on the load-carrying platform 60. Thus, the inverse U-shaped yoke 271 has 1 degree of freedom of rotational motion relative to the neck-ring seat 274 or the cover plate 275. The perpendicular stub shaft on the front and rear side of the cardan shaft 272 of the inverse U-shaped yoke 271 has 2 degrees of freedom of rotational motion relative to the neck-ring seat 274 or cover-plate 275.

Every connecting rod 26 has a fixed length. On both ends of the connecting rod 26, are pivoting holes through which the front end of the connecting rod is pivotally connected to the front perpendicular stub shaft or rear perpendicular stub shaft of the cardan shaft 272 of the universal-joint 27. Thus, the pivoting hole on the front end of the connecting rod 26 has 1 degree of freedom of rotational motion relative to the perpendicular stub shaft of the cardan shaft 272. The pivoting hole on the front end of every connecting rod 26 has 3 degrees of freedom of rotational motion relative to the neck-ring seat 274 or cover plate 275. The pivoting hole on the rear end of every connecting rod 26 is pivotally connected to the perpendicular stub shaft of the T-shaped pivot axis 252 by a bearing and nut that provide the pivoting hole on the rear end of every connecting rod 26 with 1 degree of freedom of rotational motion relative to the perpendicular stub shaft of the T-shaped pivot axis 252. The pivoting hole on the rear end of every connecting rod 26 has 3 degrees of freedom of rotational motion relative to the sliding seat 24.

Since each end of the connecting rod 26 has 3 degrees of freedom of rotational motion, the whole connecting rod 26 has 6 degrees of freedom for generating a spatial motion. The above-mentioned mechanism, as verified by the equation of mobility in Spatial Mechanism, generates a spatial motion of 6 degrees of freedom, according to Gruebler's formula for a spatial mechanism:

$$F = 6(L - j - 1) + \sum_{i=1}^{j} f_i$$

$$L = 32, j = 36, \sum_{i=1}^{j} f_i = 36; F = 6$$

Where
F: Number of degrees of freedom of the whole mechanism
L: Total number of members in the mechanism
J: Total number of joints in the mechanism
$f_i$: The number of degree of freedom of the $i^{th}$ joint.

Therefore, the relative rotating angle and rotating speed of the servo-motor 221 of the servo-driving mechanism 22 of each movement control unit 20, based on the required data or condition of the relative motion of the load-carrying platform 60 in space and by applying the precise calculation and control of the computer system (not shown in drawings), can be synchronously controlled. The sliding seat 24 and transmission-joint yoke mechanism 25 on each of the three movement control units can synchronously generate different rectilinear movements to drive the connecting rods 26 to generate relative spatial-displacements and control the relative spatial-movement of each universal-joint yoke mechanism 27, thus enabling the load-carrying platform 60 to vary its posture and angular position so as to simulate the state of a carrier (such as vehicle, ship, airplane and roller coaster etc.) making a spatial motion of 6 degrees of freedom.

In the following, is another embodiment of the movement control unit 20 that has the same mechanical structure and the same effect as that of the first embodiment of the control unit 20. This second embodiment applies the same technical and actuating principle to enable the load-carrying platform 60 to simulate a spatial motion of 6 degrees of freedom. The construction members and the inter-actuating relationship can be obtained by reference to the detailed description of the first embodiment mentioned above, which shall not be repeated here. The following description describes the second embodiment of the movement control unit 20.

Figure 5:
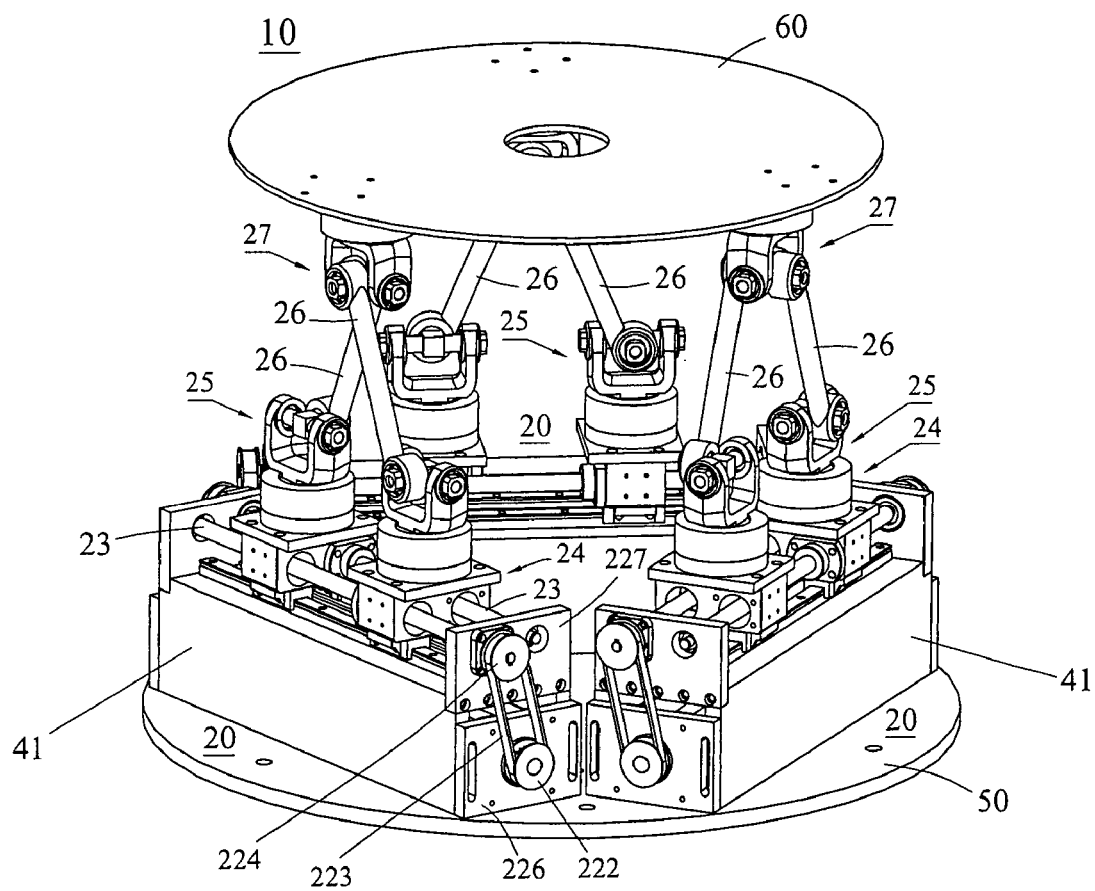
FIG. 5 illustrates a second embodiment of the hex-axis horizontal movement dynamic simulator having three sets of movement control units of the same structure located separately at the positions forming three sides of an equilateral triangle.
Figure 6:
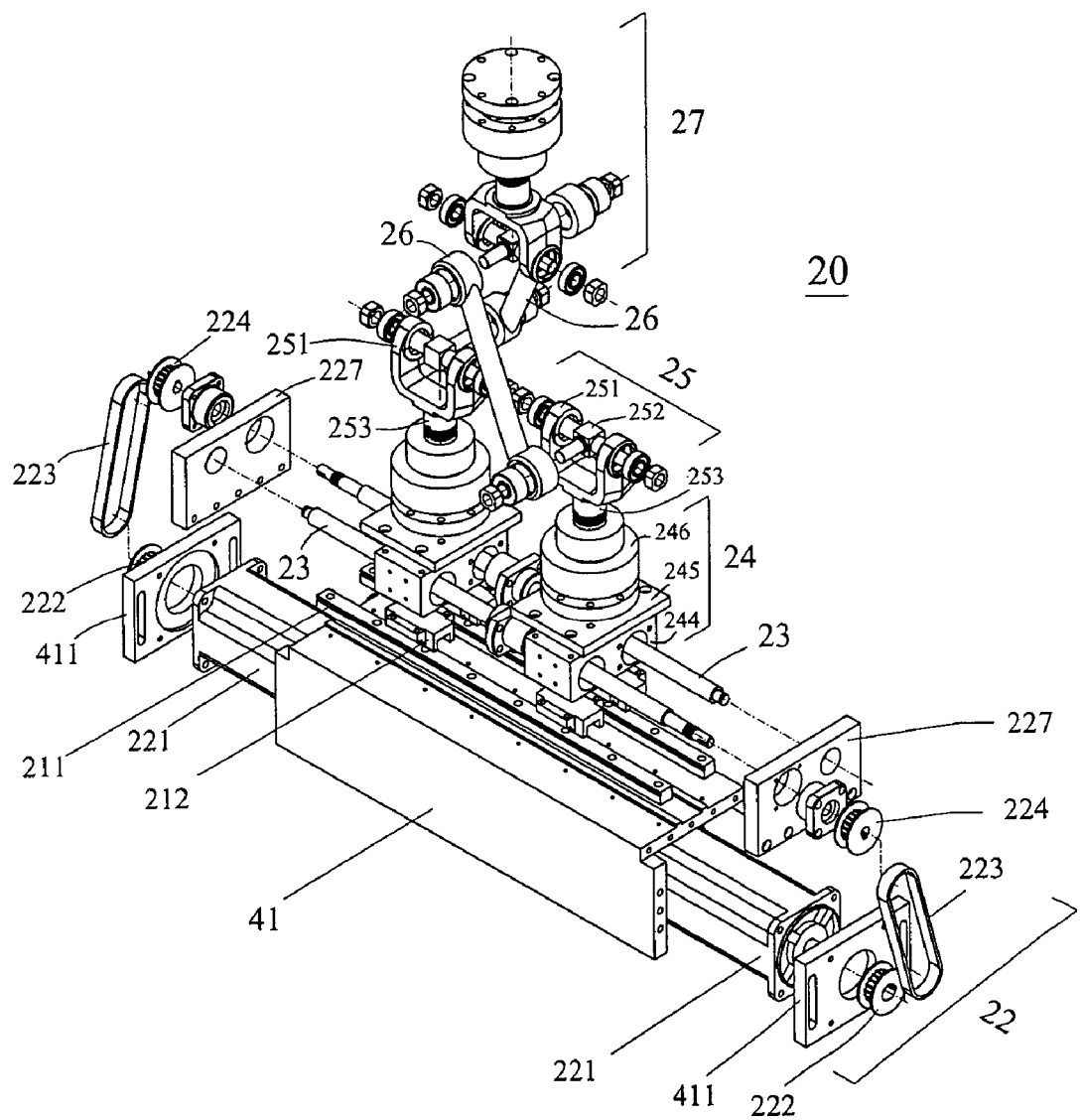
FIG. 6 is a disassembly drawing showing parts of the movement control unit illustrated in FIG. 5.

The second embodiment of the movement control unit 20 is shown in FIGS. 5 and 6 and comprises a machine bed 41, one universal-joint yoke mechanism 27, two fixed-length connecting rods, two transmission-joint yoke mechanisms 25, two sliding seats 24, two lead screws 23, two servo-driving mechanisms 22, and a rectilinear translation guide 21. The components of the universal-joint yoke mechanism 27, the connecting rod 26, the transmission-joint yoke mechanism 25, the lead screw 23, the servo-driving mechanism 22, and the rectilinear translation guide 21 are the same as those in the first embodiment of the invention.

But, the machine bed 41 of the second embodiment of the invention is a rectangular stand made of a metal plate having an inverse U-shaped cross-section that is fastened on the foundation 50. A cover plate 411 is mounted on both the left and right ends of the machine bed 41 with holes and an opening prepared at appropriate positions. The servo-motor 221 of the servo-driving mechanism 22 is installed inside the machine bed 41. The driving shaft of the servo-motor 221 extends outside the machine bed 41. Through the opening of the cover plate 411 of the machine bed 41, a driving pulley 222 is mounted and fastened on the driving shaft of the driving-servo motor 221. Two support plates 227 of the servo-driving mechanism 22 are installed at places closed to both ends of the machine bed 41 to form the support for pivotally mounting the two lead screws 23 by bearings in a position parallel to the two straight sliding rails 211 of the rectilinear translation guide 21. The driven pulley 224 is mounted and fastened on the lead screw 23 with a transmission belt installed on and passing through the driving pulley 222 and driven pulley 224. Therefore, the driving power of the servo-motor 221 is transmitted to the lead screw 23 through the driving pulley 222, the transmission belt 223, and the driven pulley 224.

The sliding seat 24 employed in the second embodiment of the invention comprises a sliding block 244 and a neck ring seat 246. The sliding block 244 is fastened on the guide seat 212 of the rectilinear translation guide mechanism 21. On the sliding block 244, two holes are provided, one of which has a female screw thread and engages with a lead screw 23. The other hole serves as the passage for another lead screw to pass through. The neck-ring seat 246 is fastened on the top side of the sliding block 244 or a fastening plate 245 is installed on the top side of the sliding block 244, first, and then the neck-ring 246 is fastened on the fastening plate 245. The mounting shaft 253 of the U-shaped yoke 251 of the transmission-joint yoke mechanism 25 is pivoted to the circular access on the tope side of the neck-ring seat 246 by a bearing and related parts.

The sliding seat 24 employed in the second embodiment and the first embodiment can be exchanged and used in either of the two embodiments or in other embodiments of the invention.

Figure 7:
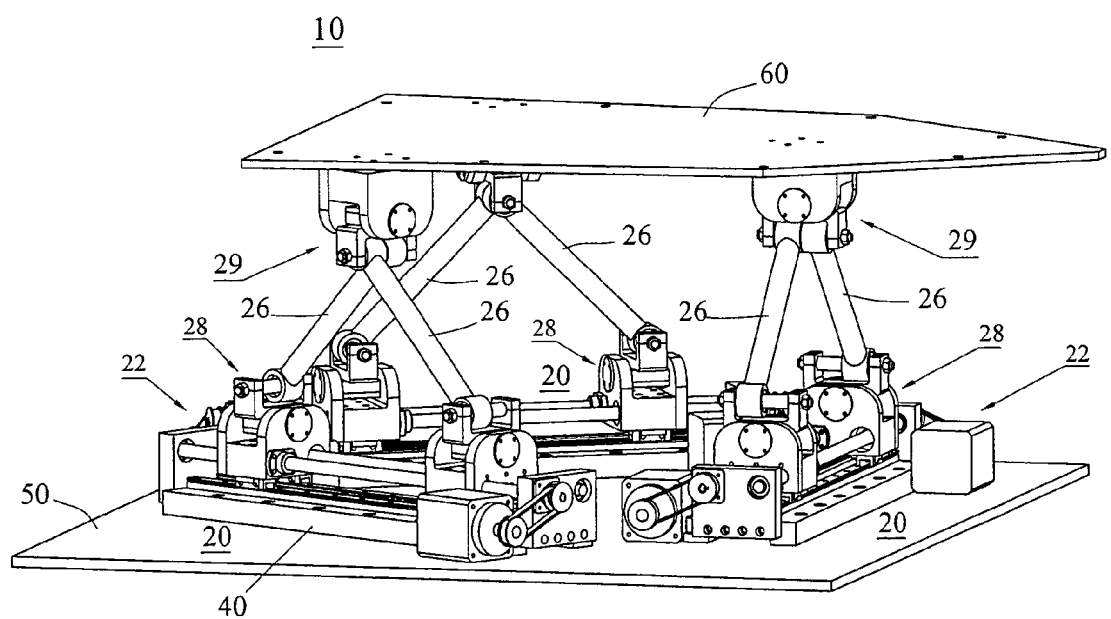
FIG. 7 illustrates a third type of embodiment of the hex-axis horizontal movement dynamic simulator having three sets of movement control units of the same structure located separately at the positions forming three sides of an equilateral triangle.
Figure 8:
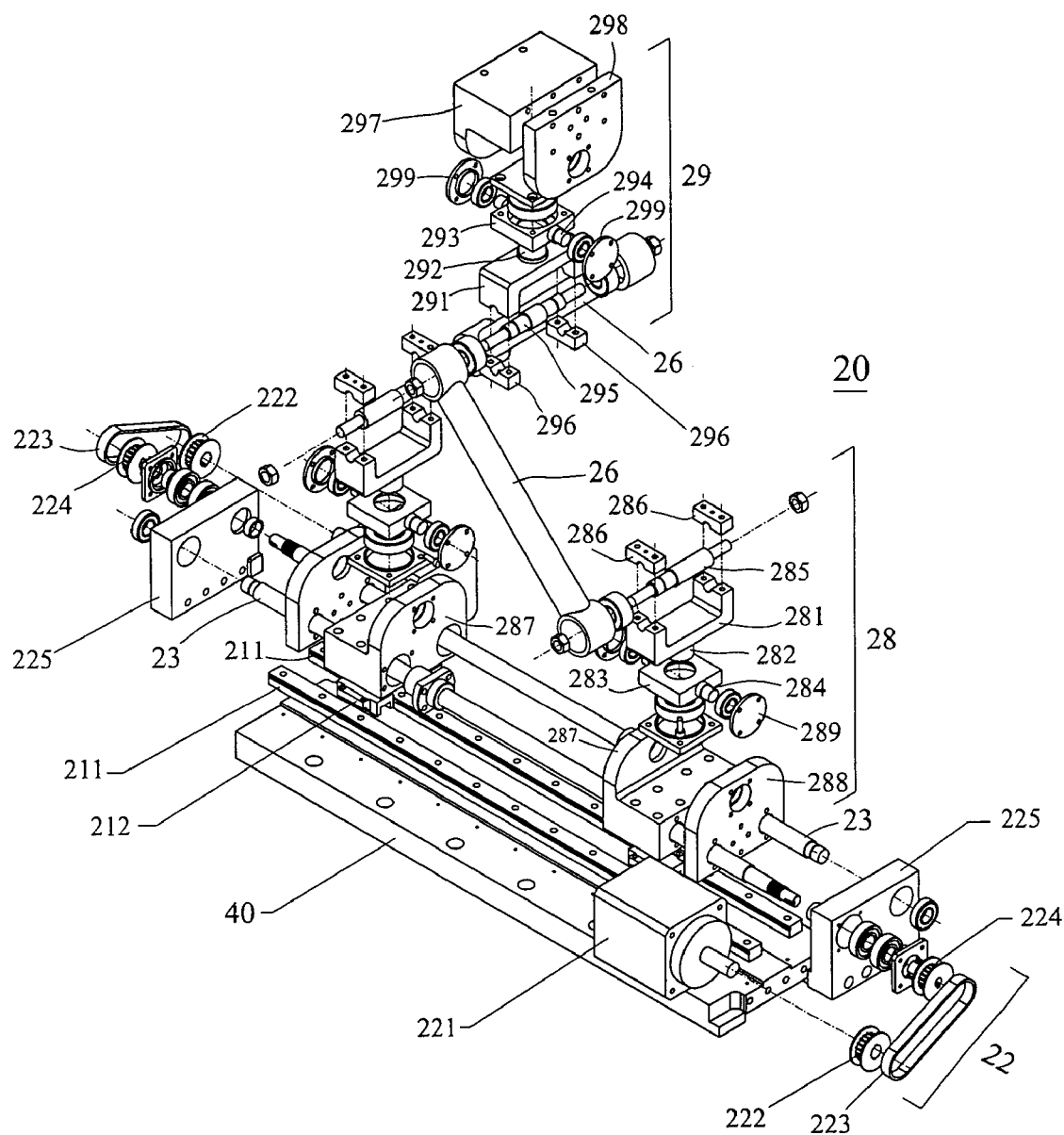
FIG. 8 is a disassembly drawing showing the parts of the movement control unit illustrated in FIG. 7.

The third embodiment of the movement control unit 20 is shown in FIGS. 7 and 8 and comprises a base seat 40, a universal-joint yoke mechanism 29, two fixed-length connecting rods 26, two sliding yoke mechanisms 28, two leading screws 23, two servo-driving mechanisms 22, and a rectilinear translation guide 21. The connecting rod 26, lead screw 23, servo-driving mechanism 22, and rectilinear translation guide 21 are the same as those employed in the first embodiment. The structure of the universal-joint yoke mechanism 29 is similar to the sliding yoke mechanism 28.

The universal-joint yoke mechanism 29 of the third embodiment comprises an inverse U-shaped yoke assembly 291, a pivoting plate 293, a pivoting shaft 295, two fixing blocks 296, an L-shaped yoke plate 297, a fastening yoke plate 298, and two cover plates 299. The L-shaped yoke plate is formed by a horizontal portion and a vertical portion. The horizontal portion is fastened on the load-carrying platform 60. A vertical portion hole is provided for mounting a shaft. The fastening yoke plate 298 is a plate-shaped member with appropriate thickness having an appearance symmetric to that of the vertical portion of the L-shaped yoke plate 297. A shaft mounting hole is also provided on the fastening yoke plate 298, which is to be assembled with the L-shaped yoke plate 297 to form a yoke assembly. The pivoting plate 293 is rectangular shape with a pivoting access in its center position and horizontal stub shafts 294 extended symmetrically from both sides opposite to each other that pivotally mount in the hole on the L-shaped yoke plate 297 and the fastening yoke plate 298 by bearings and related parts. The two cover plates are fastened on one side of the vertical portion of the L-shaped yoke plate 297 and the fastening yoke plate 298 to fix the whole assembly and provide the pivoting plate 293 with 1 degree of freedom of rotational motion relative to the L-shaped yoke plate 297 and the fastening yoke plate 298. The yoke assembly 291 has a mounting shaft 292 extended upwardly from its top side and is mounted in the pivoting access in the center position of the pivoting plate 293 by a bearing, and a cover is fastened on the mounting surface of the pivoting plate to fix the assembly. Therefore, the yoke assembly has 1 degree of freedom of rotational motion relative to the pivoting plate 293 and has 2 degrees of freedom of motion relative to the L-shaped yoke plate 297 and the fastening yoke plate 298. The bottom side of the two flanks of the yoke assembly 291 has a semicircular recess, and the fixing block 296 also has a corresponding semicircular recess on the top side. A shaft 295 is pivotally installed by fixing the two fixing blocks on the bottom side of the two flanks of the yoke assembly 291, and both ends of the pivoting shaft 295 can be pivotally connected to the connecting rod 26 so as to provide the pivot hole on the front end of each connecting rod with 1 degree of freedom of rotational motion relative to the yoke assembly 291 and 3 degrees of freedom of rotational motion relative to the L-shaped yoke plate 297 and the fastening yoke plate 298.

The sliding yoke mechanism 28 employed in the third embodiment comprises a U-shaped yoke assembly 281, a pivoting plate 283, a shaft 285, two fixing blocks 286, an L-shaped sliding yoke plate 287, a sliding fastening plate 288, and two cover plates 289. The L-shaped sliding yoke plate 287 has a horizontal portion and a vertical portion and is fastened on the guide seat 212 of the rectilinear translation guide 21 through its horizontal portion. The L-shaped sliding yoke plate 287 has two penetrating holes, one of which has a female screw thread and engages with the lead screw 23. The other hole serves as a passage for another lead screw 23 to pass through. In addition, the vertical portion of the L-shaped sliding yoke plate 287 has a pivoting hole. The sliding fastening plate 288 is a plate-shaped member of appropriate thickness and has an appearance symmetric to that of the vertical portion of the L-shaped sliding yoke plate. Two penetrating holes and a pivoting hole are provided on the sliding fastening plate 288. The two penetrating holes are for the two lead screws 23 to pass through. A yoke assembly is formed by assembling the sliding fastening plate 288 and the L-shaped sliding yoke plate 287. The pivoting plate 283 is rectangular shaped with a pivoting access in a center position and horizontal stub shafts 284 extended symmetrically from both sides opposite to each other that pivotally mount in the hole on the L-shaped sliding yoke plate 287 and the sliding fastening yoke plate 288 by a bearing and related parts. Two cover plates are fastened on one side of the vertical portion of the L-shaped sliding yoke plate 287 and the sliding fastening plate 288 to fix the whole assembly so that the pivoting plate 283 has 1 degree of freedom of rotational motion relative to the L-shaped sliding yoke plate 287 and the sliding fastening plate 288. The yoke assembly 281 has a mounting shaft 282 extended downwardly from its bottom side that is pivotally mounted in the pivoting access in the center position of the pivoting plate 283 by a bearing and related parts. A cover is fastened on the pivoting plate 283 to fix the assembly. Thus, the U-shaped yoke assembly 281 has 1 degree of freedom of rotational motion relative to the pivoting plate 283 and has 2 degrees of freedom of rotational motion relative to the L-shaped sliding yoke plate 287 and the sliding fastening plate 288. The top side of the two vertical portions of the U-shaped yoke assembly has a semicircular recess, and a corresponding semicircular recess is provided on the fixing block 286 on the bottom side. A shaft 285 is pivotally installed by fixing the two fixing blocks 286 on the top side of the U-shaped yoke assembly, and both ends of the pivoting shaft 285 can be pivotally connected to the connecting rod 26 so as to provide the pivot hole on the rear end of the connecting rod 26 with 1 degree of freedom of rotational motion relative to the U-shaped yoke assembly 281 and 3 degrees of freedom of rotational motion relative to the L-shaped sliding yoke plate 287 and the sliding fastening plate 288. Since both ends of the connecting rod 26 have 3 degrees of freedom of rotational motion, each connecting rod 26 has 6 degrees of freedom of rotational motion in space.

What is claimed is:

1. A six-degrees-of-freedom horizontal movement dynamic simulator comprising:

three movement control units located separately at positions forming three sides of an equilateral triangle, each movement control unit comprises a universal-joint yoke mechanism, two connecting rods of fixed length, two transmission-joint yoke mechanisms, two sliding seats, two lead screws, two servo-driving mechanisms, a rectilinear translation guide, and two guide seats, and each movement control unity generates rectilinear translation motion and forms a symmetric structure; and a load-carrying platform pivotally connected to the three movement control units by the universal-joint yoke mechanism corresponding to each movement control unit, wherein for each movement control unit:

one end of each of the two connecting rods is jointly pivoted to the universal-joint yoke mechanism to provide a spatial motion of 3 degrees of freedom relative to the load-carrying platform and the other ends of the two connecting rods are symmetrically and separately pivoted to corresponding transmission-joint yoke mechanisms to provide a spatial motion of 2 degrees of freedom, each transmission-joint yoke mechanism is pivoted to the corresponding sliding seat to enable 1 degree of freedom, the two lead screws pass through the two sliding seats and engage with the corresponding sliding seat such that the rotating angle and speed of each lead screw is controlled by the corresponding servo-driving mechanism, the two sliding seats are mounted and slide on the rectilinear translation guide such that the rectilinear translation motion of the sliding seat on the rectilinear translation guide is precisely controlled by the rotating angle and speed of the corresponding sliding seat, so as to provide a precise control of the spatial motion and linear and angular displacement of the load-carrying platform, the rectilinear translation guide comprises two straight sliding rails in parallel fixed on a guide, and each of the two guide seats has two parallel guide slots on the bottom side to match and ride on the two parallel straight sliding rails and slide along the direction of the guide rails, each servo-driving mechanism comprises a servo-motor that drives the corresponding lead screw and controls its rotating angle and speed, each sliding seat has a rectangular block shape, a pivoting recess on the top side for pivotally mounting the corresponding transmission-joint yoke mechanism, and its bottom side fastened to one of the guide seats, on the vertical surface of each sliding seat are two penetrating holes one of which has a female screw thread and engages with the corresponding lead screw and the other hole serves as the passage for the other lead screw to pass through, each transmission-joint yoke mechanism comprises an upward yoke assembly and a T-shaped pivot axis that is pivotally assembled together with the yoke assembly, two horizontal stub shafts formed on and extending from opposite sides of the T-shaped pivot axis are pivotally mounted on the two vertical portions of the upward yoke assembly, a perpendicular stub shaft extends from the center position of the yoke assembly for pivotally mounting one end of the corresponding connecting rod, a mounting shaft is extended from the bottom side of the upward yoke assembly and is pivotally mounted in the mounting recess of the corresponding sliding seat, and the universal-joint yoke mechanism comprises a downward yoke, a cardan shaft, a neck-ring seat and a cover plate, two horizontal stub shafts are formed and extend oppositely from left and right sides of the cardan shaft and are pivoted to the two vertical portions of the downward yoke, two perpendicular stub shafts are formed on and extend oppositely from the front and rear sides of the cardan shaft and are separately and pivotally connected to the connecting rod, a mounting shaft is formed on the top side of the downward yoke and pivotally mounted to the neck-ring seat, the bottom side of the cover pate is fastened to the upper side of the neck-ring seat and the top side of the cover plate is fastened to the load-carrying platform.

2. The six-degrees-of-freedom horizontal movement dynamic simulator of claim 1, wherein each sliding seat comprises a sliding block and a neck-ring seat, the bottom side of the sliding block is fastened to the guide seat of the rectilinear translation guide and the neck-ring seat is fastened to the top side of the sliding block with the mounting shaft of the upward yoke pivotally mounted in the mounting recess of the neck-ring seat.

3. The six-degrees-of-freedom horizontal movement dynamic simulator of claim 2, wherein a fastening plate is fastened on the top side of the sliding block and the bottom side of the neck-ring seat is fastened to the top side of fastening plate.

4. A six-degrees-of-freedom horizontal movement dynamic simulator comprising:

three movement control units located at positions forming three sides of an equilateral triangle, each movement control unit comprises a machine bed, a universal-joint yoke mechanism, two connecting rods of fixed length, two transmission-joint yoke mechanisms, two sliding seats, two lead screws, two servo-driving mechanisms, and a rectilinear transmission guide; and a load-carrying platform pivotally connected to the three movement control units by the universal-joint yoke mechanism corresponding to each movement control unit, wherein for each movement control unit:

the machine bed is a longitudinal stand having an inverse U-shaped cross section with two cover plates fixed on both ends of the bed, the rectilinear transmission guide has two parallel straight sliding rails fastened on its top side and two guide seats, having two parallel guide slots on their bottom sides, for matching the straight sliding rails and sliding in the direction of the straight rails, each of the servo-driving mechanisms is installed near the end of the machine bed by a bearing plate that serves as the support of the two lead screws, the servo-driving mechanism also has a servo-motor installed inside the machine bed to provide a driving system with the corresponding lead screw so as to control the rotating angle and speed of the lead screw, each sliding seat comprises a sliding block and a neck-ring seat, the bottom side of the sliding block is fastened on the guide seat of the rectilinear translation guide, and the sliding block has two penetrating holes on its vertical surfaces of which one hole has a female screw thread for engaging with a corresponding lead screw and the other hole serves as the passage for the other lead screw to pass through, the neck-ring seat is fastened on the top side of the sliding block and has a mounting recess in a center position for pivotally installing a mounting shaft of the yoke of the transmission-joint yoke mechanism, each transmission-joint yoke mechanism comprises an upward yoke and a T-shaped pivot axis, the T-shaped pivot axis has two horizontal stub shafts formed on and extending from opposite sides and pivoted on the two vertical portions of the upward yoke, the T-shaped pivot axis has a perpendicular stub shaft that is pivotally connected to one end of the corresponding connecting rod, the mounting shaft is formed on the bottom side of the upward yoke and is pivotally installed on the mounting recess of the corresponding sliding seat, and the universal-joint yoke mechanism comprises a downward yoke, a cardan shaft, a neck-ring seat and a cover plate, the cardan shaft has two horizontal stub shafts formed on and extending from the left and right side, which are pivoted on the two vertical portions of the downward yoke, also two perpendicular stub shafts are formed and extend from the rear and front side and are each pivotally and separately mounted on one of the two connecting rods, the downward yoke has a mounting shaft on the top side that is pivotally installed on the neck-ring seat, and the cover plate has its bottom side fastened on the neck-ring seat and top side fastened to the load-carrying platform.

5. The six-degrees-of-freedom horizontal movement dynamic simulator of claim 4 wherein a fixing plate is installed on the top side of the sliding block and the bottom side of the neck-ring is fixed on the top side of the said fixing plate.

6. The six-degrees-of-freedom horizontal movement dynamic simulator of claim 5, wherein the sliding seat is in the shape of a rectangular block.

7. A six-degrees-of-freedom horizontal movement dynamic simulator comprising:
- three movement control units located in positions forming three sides of an equilateral triangle, each movement control unit comprising a universal-joint yoke mechanism, two connecting rods of fixed length, two sliding yoke mechanisms, two lead screws, two servo-driving mechanisms, and a rectilinear translation guide; and
- a load carrying platform connected to the three movement control units by the universal-joint yoke mechanism of each movement control unit, wherein for each movement control unit:
- the rectilinear translation guide has two straight sliding rails parallel to each other and two guide seats, each of which has two parallel guide slots on the bottom side for matching the two straight sliding rails and sliding along the direction of the rails,
- each servo-driving mechanism comprises a servo-motor that provides a driving system with a corresponding lead screw for driving and controlling the rotating angle and speed of the lead screw,
- each sliding yoke mechanism comprises an upward yoke, a pivoting plate, a shaft, two fixing blocks, one L-shaped sliding yoke plate, one sliding fastening plate and two cover plates, the L shaped sliding yoke plate has a horizontal portion and a vertical portion, a pivoting hole is formed in the vertical portion and the bottom side of the horizontal portion is fastened on the guide seat of the rectilinear transmission guide, the L-shaped sliding yoke plate has two penetrating holes in the vertical portion, one of which has a female screw thread for engaging with a corresponding lead screw and the other hole serves as the passage for the other lead screw to pass through;
- the L-shaped sliding yoke plate and the sliding fastening plate are assembled to form an L-shaped yoke assembly, on the sliding fastening plate are two penetrating holes and a pivoting hole in the positions corresponding to the positions of the two penetrating holes and one pivoting hole on the L-shaped sliding yoke plate, the two penetrating holes on the sliding fastening plate are the passages for the lead screw to pass through,
- the pivoting plate is in the shape of a rectangular plate with a pivoting recess on the center position and two horizontal stub shafts formed on and extending from two opposite sides that are pivotally installed on the pivoting holes on the vertical portion of the L-shaped sliding yoke plate and the sliding fastening plate, and two cover plates for supporting the stub shafts of the pivoting plate are separately fastened on the vertical portion of the L-shaped sliding yoke plate and the sliding fastening plate,
- the upward yoke has a mounting shaft on the bottom side that is pivotally installed on the pivoting recess in the center position of the pivoting plate, on the top side of the two vertical portions of the upward yoke are two semicircular recesses, the two fixing blocks have corresponding semicircular recesses and are fastened to the two vertical portions, a shaft is pivotally mounted through the recesses for supporting one end of one of the two connecting rods, and
- the universal-joint yoke mechanism comprises a downward yoke, a pivoting plate, a shaft, two fixing blocks, an L-shaped yoke plate, a fastening plate and two cover plates, the L-shaped yoke plate has a horizontal portion and a vertical portion, the horizontal portion is fastened to the load-carrying platform and the vertical portion has a pivoting hole, the assembly of the L-shaped yoke plate and fastening plate forms a downward yoke for mounting stub shafts formed on and extending from the left and right sides of the pivoting plate, which is in the shape of a rectangular plate and has a pivoting recess on a center position, two cover plates are fastened on the vertical portion of the L-shaped yoke plate and the fastening plate to fix the whole assembly, the downward yoke has a mounting shaft that is pivotally installed on the pivoting recess in the center position of the pivoting plate and has semicircular recesses on the bottom side of its two vertical portions for mounting a shaft by installing two fixing blocks having the same semicircular recess to the bottom side of the two vertical portions, and one end of each of the two connecting rods is pivotally and separately mounted on opposite ends of the shaft.

* * * * *